United States Patent
Ishimatsu

(10) Patent No.: US 9,705,369 B2
(45) Date of Patent: Jul. 11, 2017

(54) METHOD OF RESIN-SEALING LAMINATED CORE

(71) Applicant: Mitsui High-tec, Inc., Kitakyushu-shi, Fukuoka (JP)

(72) Inventor: Hisatomo Ishimatsu, Kitakyushu (JP)

(73) Assignee: MITSUI HIGH-TEC, INC., Kitakyushu-shi (JP)

(*) Notice: Subject to any disclaimer, the term of this patent is extended or adjusted under 35 U.S.C. 154(b) by 390 days.

(21) Appl. No.: 14/049,770

(22) Filed: Oct. 9, 2013

(65) Prior Publication Data

US 2014/0103574 A1 Apr. 17, 2014

(30) Foreign Application Priority Data

Oct. 12, 2012 (JP) ................................. 2012-227126

(51) Int. Cl.
*B29C 45/14* (2006.01)
*H02K 1/28* (2006.01)
(Continued)

(52) U.S. Cl.
CPC .............. *H02K 1/28* (2013.01); *B29C 45/14* (2013.01); *B29C 45/14065* (2013.01); *B29C 45/14344* (2013.01); *B29C 45/14778* (2013.01); *H02K 1/276* (2013.01); *H02K 15/03* (2013.01); *B29L 2031/3481* (2013.01); *B29L 2031/7498* (2013.01)

(58) Field of Classification Search
None
See application file for complete search history.

(56) References Cited

U.S. PATENT DOCUMENTS

| 4,312,119 A | 1/1982 | Perucchi et al. |
| 4,315,173 A | 2/1982 | Calfo et al. |
| (Continued) | | |

FOREIGN PATENT DOCUMENTS

| CN | 101356711 A | 1/2009 |
| CN | 101390273 A | 3/2009 |
| (Continued) | | |

OTHER PUBLICATIONS

International Search Report for PCT/JP2011/074972, mailing date of Jan. 13, 2012 (2 pages).

(Continued)

*Primary Examiner* — Edmund Lee
(74) *Attorney, Agent, or Firm* — Westerman, Hattori, Daniels & Adrian, LLP

(57) ABSTRACT

A method of resin-sealing a laminated core, including inserting permanent magnets 24 into magnet insertion holes 18 of a core body 15, pressing the body 15 with upper and lower dies 11, 12, and injecting resin 29 to the holes 18 from a resin reservoir 17 of the die 11 or 12 via a runner 19 in a removable cull plate 14, one end of the runner 19 having plural resin injection holes 33, 34 per hole 18. The resin 29 presses the magnets 24 in the holes 18 to one sides in a radial direction of the holes 18. Thereby, resin-sealing is performed using the plate 14 and the magnets 24 are arranged in radially outward or inward sides even with narrow gaps between the magnets 24 and the holes 18 or without resin injection holes in centers in a width direction of the holes 18.

5 Claims, 6 Drawing Sheets

(51) Int. Cl.
- H02K 1/27 (2006.01)
- H02K 15/03 (2006.01)
- B29L 31/34 (2006.01)
- B29L 31/00 (2006.01)

(56) References Cited

U.S. PATENT DOCUMENTS

| | | | |
|---|---|---|---|
| 4,614,022 | A | 9/1986 | Bibby et al. |
| 5,859,486 | A | 1/1999 | Nakahara et al. |
| 5,893,205 | A | 4/1999 | McClelland |
| 6,167,610 | B1 | 1/2001 | Nakahara et al. |
| 7,653,984 | B2 | 2/2010 | Amano et al. |
| 7,854,056 | B2 | 12/2010 | Watanabe et al. |
| 7,950,133 | B2 | 5/2011 | Amano et al. |
| 8,020,280 | B2 | 9/2011 | Fukumaru et al. |
| 8,578,592 | B2 | 11/2013 | Nagai et al. |
| 2008/0276446 | A1 | 11/2008 | Amano et al. |
| 2009/0026867 | A1 | 1/2009 | Haruno et al. |
| 2009/0174273 | A1 | 7/2009 | Watanabe et al. |
| 2010/0026127 | A1 | 2/2010 | Mizutani et al. |
| 2010/0083486 | A1 | 4/2010 | Amano et al. |
| 2011/0000079 | A1 | 1/2011 | Fukumaru et al. |
| 2012/0222289 | A1 | 9/2012 | Nagai et al. |
| 2012/0324719 | A1 | 12/2012 | Sasaki et al. |
| 2013/0162063 | A1 | 6/2013 | Sasajima |
| 2013/0228280 | A1 | 9/2013 | Hirayama et al. |
| 2014/0103574 | A1 | 4/2014 | Ishimatsu |
| 2014/0124980 | A1 | 5/2014 | Nagai et al. |

FOREIGN PATENT DOCUMENTS

| | | | |
|---|---|---|---|
| JP | 11-262205 | A | 9/1999 |
| JP | 2002-34187 | A | 1/2002 |
| JP | 2002-247784 | A | 8/2002 |
| JP | 2005-287134 | A | 10/2005 |
| JP | 3786946 | B1 | 6/2006 |
| JP | 2006-197693 | A | 7/2006 |
| JP | 2006-211748 | A | 8/2006 |
| JP | 2006-238584 | A | 9/2006 |
| JP | 2006-345600 | A | 12/2006 |
| JP | 2007-068356 | A | 3/2007 |
| JP | 2007-215301 | A | 8/2007 |
| JP | 2007-318942 | A | 12/2007 |
| JP | 2008-36671 | A | 2/2008 |
| JP | 2008-042967 | A | 2/2008 |
| JP | 2008-54376 | A | 3/2008 |
| JP | 2008-154436 | A | 7/2008 |
| JP | 2008-263722 | A | 10/2008 |
| JP | 2009-077547 | A | 4/2009 |
| JP | 2009-100634 | A | 5/2009 |
| JP | 2009-195011 | A | 8/2009 |
| JP | 2009-303485 | A | 12/2009 |
| JP | 4414417 | B2 | 2/2010 |
| JP | 2010-158164 | A | 7/2010 |
| JP | 2010-187535 | A | 8/2010 |
| JP | 2010-246266 | | * 10/2010 |
| JP | 2010-246266 | A | 10/2010 |
| JP | 2011-55687 | A | 3/2011 |
| JP | 4688505 | B2 | 5/2011 |
| JP | 2012-10572 | A | 1/2012 |
| JP | 4991900 | B2 | 8/2012 |
| WO | 2006/077998 | A1 | 7/2006 |
| WO | 2007/026900 | A1 | 3/2007 |
| WO | 2008/007679 | A1 | 1/2008 |
| WO | WO2011/145399 | | * 11/2011 |

OTHER PUBLICATIONS

Office Action dated Aug. 5, 2014, issued in corresponding Japanese Patent Application No. 2012-171366 (2 pages).
Office Action dated Sep. 30, 2014, issued in corresponding Japanese Patent Application No. 2010-278335 (2 pages).
International Search Report for PCT/JP2011/074842, mailing date of Jan. 31, 2012 (2 pages).
Notification of Reasons for Refusal dated Sep. 17, 2013, issued by JPO on Japanese Patent application No. 2013-161703 (3 pages).
International Search Report of PCT/JP2011/058452, mailing date of Jun. 28, 2011 (2 pages).
Chinese Office Action dated Oct. 10, 2014, issued in corresponding CN Application No. 201180039235.6 (6 pages).
Japanese Office Action dated Sep. 30, 2014, issued in corresponding JP Application No. 2010-272769 (3 pages).
Notice of Allowance dated Sep. 21, 2015, issued in U.S. Appl. No. 13/885,065 (11 pages).
Notice of Allowance dated Aug. 13, 2013, issued in U.S. Appl. No. 13/509,190. (8 pages).
Non-Final Office Action dated Sep. 11, 2014, issued in U.S. Appl. No. 13/885,065 (13 pages).
Ex Parte Quayle dated Feb. 28, 2013, issued in U.S. Appl. No. 13/509,190. (9 pages).
Non-Final Office Action dated Jun. 16, 2015, issued in U.S. Appl. No. 13/885,050 (21 pages).
Final Office Action dated Jan. 4, 2016, issued in U.S. Appl. No. 14/072,241 (7 pages).
Final Office Action dated Dec. 17, 2015, issued in U.S. Appl. No. 13/885,050 (19 pages).
Notification of Reasons for Refusal issued by JPO on Japanese patent application No. 2011-139741; with English translation. (8 pages).
Notification of Reasons for Refusal by SIPO on Chinese patent application No. 201310471440.0; with English translation. (12 pages).
Notification of Reasons for Refusal by SIPO on Chinese patent application No. 201310540651.5; with English translation (18 pages).
Notification of Reasons for Refusal dated Mar. 14, 2014, by SIPO on Chinese patent application No. 201210208937.9. (6 pages).
Notice of Allowance dated Dec. 16, 2015, issued in U.S. Appl. No. 13/885,065. (9 pages).
English translation of Chinese Office Action dated Oct. 10, 2014, issued in corresponding CN Application No. 201180039235.6 submitted on Nov. 2, 2015.
English translation of Japanese Office Action dated Sep. 30, 2014, issued in corresponding JP Application No. 2010-272769 submitted on Nov. 2, 2015.
English translation of Japanese Office Action dated Aug. 5, 2014, issued in corresponding Japanese Patent Application No. 2012-171366 submitted on Nov. 2, 2015.
English translation of Japanese Office Action dated Sep. 30, 2014, issued in corresponding Japanese Patent Application No. 2010-278335 submitted on Nov. 2, 2015.
English translation of Japanese Office Action dated Sep. 17, 2013 issued by JPO on Japanese Patent Application No. 2013-161703 submitted on Nov. 2, 2015.
English translation of Notification of Reasons for Refusal dated Mar. 14, 2014, by SIPO on Chinese patent application No. 201210208937.9, submitted on Jan. 8, 2016. (6 pages).
Non-Final Office Action dated Aug. 26, 2016, issued in U.S. Appl. No. 13/885,050 (36 pages).
Notice of Allowance dated Sep. 26, 2016, issued in U.S. Appl. No. 14/072,241 (11 pages).
Final Office Action dated Jun. 14, 2016, issued in U.S. Appl. No. 14/072,241 (15 pages).
Decision of Patent Grant dated Jul. 15, 2016, issued in Japanese Application No. 2012-227126, with English translation (6 pages).
Second Notice of Reasons for Refusal dated Jun. 22, 2016, issued in Chinese Application No. 201310540651.5, with English translation (10 pages).
Second Notice of Reason for Refusal dated May 30, 2016, issued in Chinese Application No. 201310471440.0, with English translation (9 pages).
Notice of Allowance dated May 10, 2016, issued in U.S. Appl. No. 13/885,065 (16 pages).
Office Action dated Nov. 22, 2016, issued in counterpart European Application No. 11 846 665.5 (9 pages).

* cited by examiner

RELATED ART

RELATED ART

METHOD OF RESIN-SEALING LAMINATED CORE

TECHNICAL FIELD

The present invention relates to a method of resin-sealing a laminated core formed by laminating a plurality of core pieces, in which magnet insertion holes each having a permanent magnet (including unmagnetized one) inserted therein are sealed with resin.

BACKGROUND ART

In a conventional method of resin-sealing a laminated core, a resin reservoir is provided in an upper die or a lower die, resin inside the resin reservoir is heated, and the resin is pushed out with a plunger and poured into magnet insertion holes formed in the laminated core. Also, to facilitate a removal of resin culls remained on a surface of the laminated core after a resin-sealing process, Patent Literature 1 discloses a technique in which a cull plate including a runner (a resin passage) and a gate hole is placed on the surface of the laminated core and the resin is poured into the magnet insertion holes through the cull plate.

Furthermore, in some cases, the laminated core is manufactured such that the permanent magnets inserted in the magnet insertion holes are gathered in a radially outward side or a radially inward side of the laminated core. When the permanent magnets are placed in outward sides of the magnet insertion holes, a motor effective in reducing noises, losses, and oscillations can be manufactured. When the permanent magnets are placed in inward sides of the magnet insertion holes, breakages or damages of the permanent magnets can be avoided (see Patent Literature 2).

CITATION LIST

Patent Literature

Patent Literature 1: Japanese Unexamined Patent Application Publication No. 2008-054376
Patent Literature 2: Japanese Unexamined Patent Application Publication No. 2006-238584 (FIG. 15, FIG. 19)

SUMMARY OF INVENTION

Technical Problem

As shown in FIG. 5, if resin is poured from a center in an inward side of a magnet insertion hole 61 into which a permanent magnet 60 is inserted with or without a cull plate, the resin can be stably poured. Particularly, in a case where a laminated core 62 includes resin injection holes 63 each located at the center in the inward side or an outward side of the magnet insertion hole 61, the permanent magnets 60 are easily pressed to the outward sides or the inward sides of the magnet insertion holes 61.

As shown in FIG. 6(A), due to a structural problem of a laminated core 65, if a resin injection hole 66 is located off a center in a width direction of a magnet insertion hole 67, a permanent magnet 68 cannot be evenly covered with resin and thereby the permanent magnet 68 is fixed in a way that the permanent magnet 68 is inclined with respect to the magnet insertion hole 67.

In addition, FIG. 6(B) shows a case where a resin injection hole is not provided in a center in a width direction of a magnet insertion hole 71 of a laminated core 70. In this case, even if resin is poured from one part located in a center of a permanent magnet 72, a narrow gap between a wall surface of the permanent magnet 72 and the magnet insertion hole 71 prevents the resin from evenly flowing, thereby the magnet insertion hole remains unfilled. In light of this, a way of pouring the resin from corners 73, 74 each having a large gap between the magnet insertion hole 71 and the permanent magnet 72 is disclosed (see Patent Literature 2). However, this case also causes a problem like the one in the laminated core 65. The resin does not flow around a center of the wall surface of the permanent magnet 72, thus the wall surface of the permanent magnet 72 inclines toward a wall surface of the magnet insertion hole 71. These problems frequently occur in a particular case where plural permanent magnets are inserted in one magnet insertion hole. For example, if one permanent magnet among the plural permanent magnets is fixed in a tilted position, all of the permanent magnets can not be pressed uniformly in the outward side or the inward side of the magnet insertion hole.

The present invention has been made in view of the above circumstances, and it is an object of the present invention to provide a method of resin-sealing a laminated core, in which resin-sealing is performed using a cull plate and permanent magnets can be gathered in a radially outward side or a radially inward side when a gap between the permanent magnets and the magnet insertion hole is narrow or when a center in a width direction of the magnet insertion hole does not include a resin injection hole.

Solution to Problem

To accomplish the above object, the present invention provides a method of resin-sealing a laminated core, comprising: laminating a plurality of core pieces to form a core body including a plurality of magnet insertion holes circumferentially; inserting permanent magnets into each of the magnet insertion holes of the core body; pressing the core body with an upper die and a lower die in a direction where the core pieces are laminated; and injecting resin to the magnet insertion holes from a resin reservoir provided in the upper die or the lower die via a runner formed in a removable cull plate and thereby fixing the permanent magnets; wherein one end of the runner comprises a plurality of resin injection holes with respect to the one magnet insertion hole, and the injected resin presses the permanent magnets inserted in the magnet insertion holes to one side in a radial direction of each of the magnet insertion holes.

In the method of resin-sealing a laminated core according to the present invention, it is possible that a terminal end of the runner includes a penetrated passage vertically penetrating the cull plate, and a part shared by the penetrated passage and the magnet insertion hole forms the resin injection hole.

In the method of resin-sealing a laminated core according to the present invention, it is preferable that the plurality of the magnet insertion holes are formed along longitudinal sidewalls of the permanent magnets each having a rectangular cross section. Here, the rectangular includes a rectangular shape with rounded corners or chamfered corners (the same can be applied in the description hereinbelow).

In the method of resin-sealing a laminated core according to the present invention, it is preferable that the plurality of the resin injection holes are located in radially inward sides or radially outward sides of the magnet insertion holes.

In the method of resin-sealing a laminated core according to the present invention, it is preferable that each of the resin injection holes has an identical cross sectional area.

In the method of resin-sealing a laminated core according to the present invention, it is acceptable that each of the resin injection holes has a different cross sectional area.

Advantageous Effects of Invention

In the method of resin-sealing a laminated core according to the present invention, the end of the runner includes the plural resin injection holes per magnet insertion hole. Thus, even when the gaps between the permanent magnets and the magnet insertion holes are small or when the resin injection holes are not provided in centers in the width direction of the magnet insertion holes, the resin can be freely injected to balanced positions in view of the tilt of the permanent magnets, i.e., positions where the permanent magnets are not tilted. Thereby, the permanent magnets inserted in the magnet insertion holes can be placed one side (i.e., outward side or inward side) in the radial direction of the magnet insertion hole without any influence from shapes of the magnet insertion holes.

Particularly, in the method of resin-sealing a laminated core according to the present invention, when a terminal end of the runner includes the penetrated passage vertically penetrating the cull plate and a part shared by the penetrated passage and the magnet insertion hole forms the resin injection hole, the resin flows more smoothly and the tilt of the permanent magnet is surely prevented. In addition, when culls are removed from the cull plate, the resin exposes from a part of the penetrated passage, which makes it advantageously easy to remove the culls. At the same time, the core body is used for a part of the resin injection hole and thus wears of the cull plate can be reduced.

Furthermore, the position of the penetrated passage can be freely chosen, and thus the cull plate can be designed in accordance with the shape of the core body.

In the method of resin-sealing a laminated core according to the present invention, when the plural resin injection holes are formed along the longitudinal sidewalls of the permanent magnets each having the rectangular cross section, inflow passages of the resin can be surely secured. Even if the permanent magnets are placed in the magnet insertion hole in a tilted manner, the permanent magnets can be certainly pressed to a wall of the magnet insertion hole.

Particularly, in the method of resin-sealing a laminated core according to the present invention, when each of the resin injection holes has the identical cross sectional area, the permanent magnets are given a more even force. Thereby, the permanent magnets are more evenly pressed to the wall of the magnet insertion hole.

DESCRIPTION OF EMBODIMENTS

Referring to the accompanying drawings, embodiments of the present invention will be described.

Figure 1:
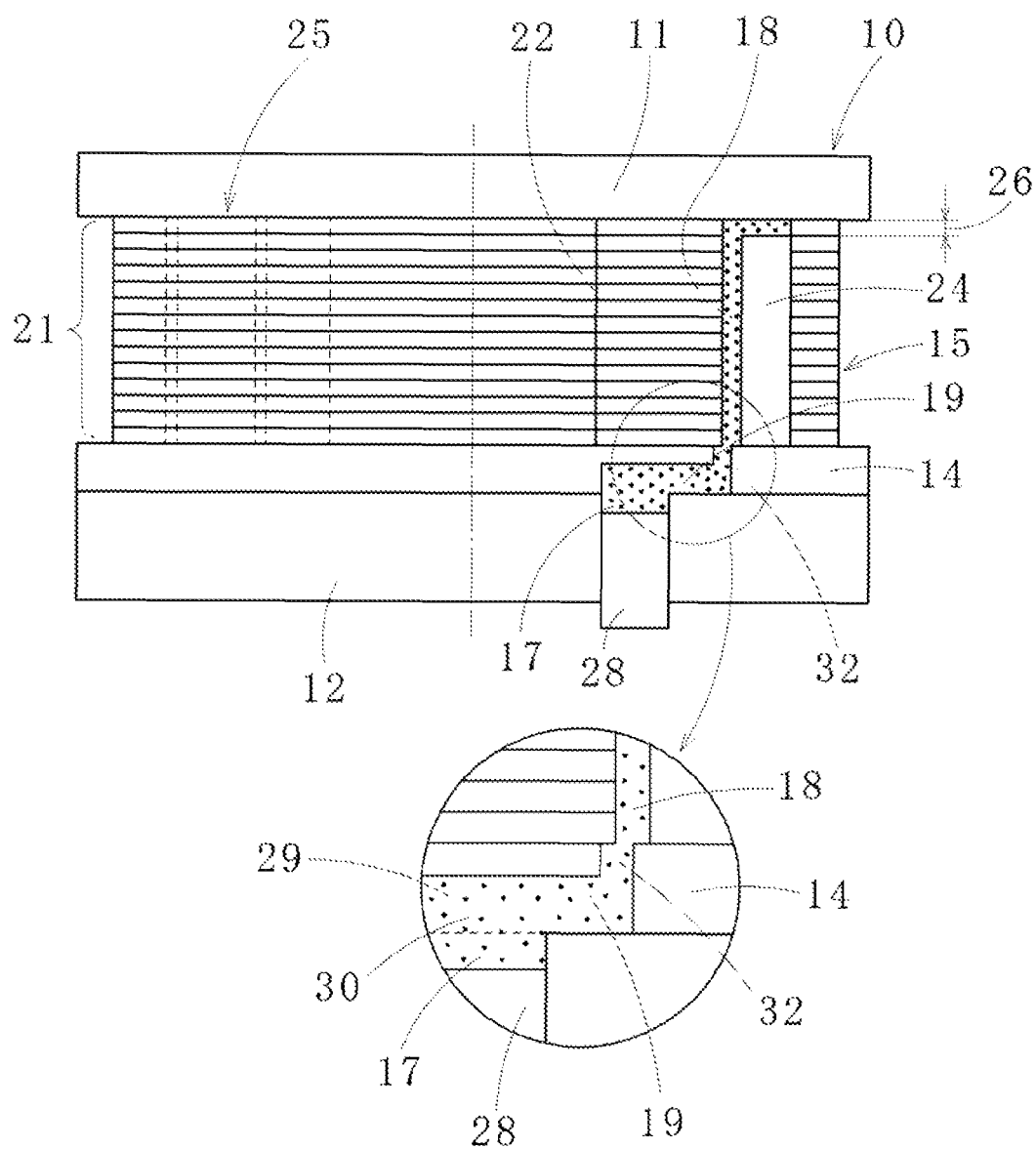
FIG. 1 is a schematic view of a device used in a method of resin-sealing a laminated core according to a first embodiment of the present invention.

FIGS. 1(A) and 1(B) show a resin-sealing device 10 used in a method of resin-sealing a laminated core according to a first embodiment of the present invention. The resin-sealing device 10 includes a pair of an upper die 11 and a lower die 12. The upper die 11 (or the lower die 12, or both of the upper and lower dies) includes an unillustrated elevating means to press a core body 15 placed on the lower die 12 via a cull plate (dummy plate) 14 in a lamination direction (a direction in which core pieces are laminated). In this embodiment, a laminated rotor core is described as an example of a laminated core including the core body 15 as an element, but the present invention can be used for a laminated stator core.

Also in this embodiment, plural resin reservoirs 17 are provided in the lower die 12 and resin 29 is injected to magnet insertion holes 18 corresponding to the resin reservoirs 17 via the cull plate 14. Here, the resin 29 (thermosetting resin) can be injected from one resin reservoir 17 to plural magnet insertion holes 18 via a runner 19 formed in the cull plate 17 and plural resin injection holes 33, 34.

The core body 15 to be the laminated core is manufactured by punching a magnetic steel plate to produce plural core pieces 21 each having a predetermined shape and laminating and interlocking the core pieces 21. The core body 15 includes a shaft hole 22 in a center thereof and the plural magnet insertion holes 18 around the shaft hole 22. Each of the magnet insertion holes 18 includes one or more permanent magnets (unmagnetized) 24 inserted therein in advance. A small gap 26 (0.5-2 mm) is provided between each top end of the inserted permanent magnets 24 and a top end surface 25 of the core body 15.

The resin reservoir 17 provided in the lower die 12 includes a plunger 28, which is inserted from a bottom of the resin reservoir 17 and moves up and down. Also, the lower die 12 includes a heater for heating the lower die 12, which can keep the resin 29 inside the resin reservoir 17 dissolved in a predetermined temperature.

Figure 2:
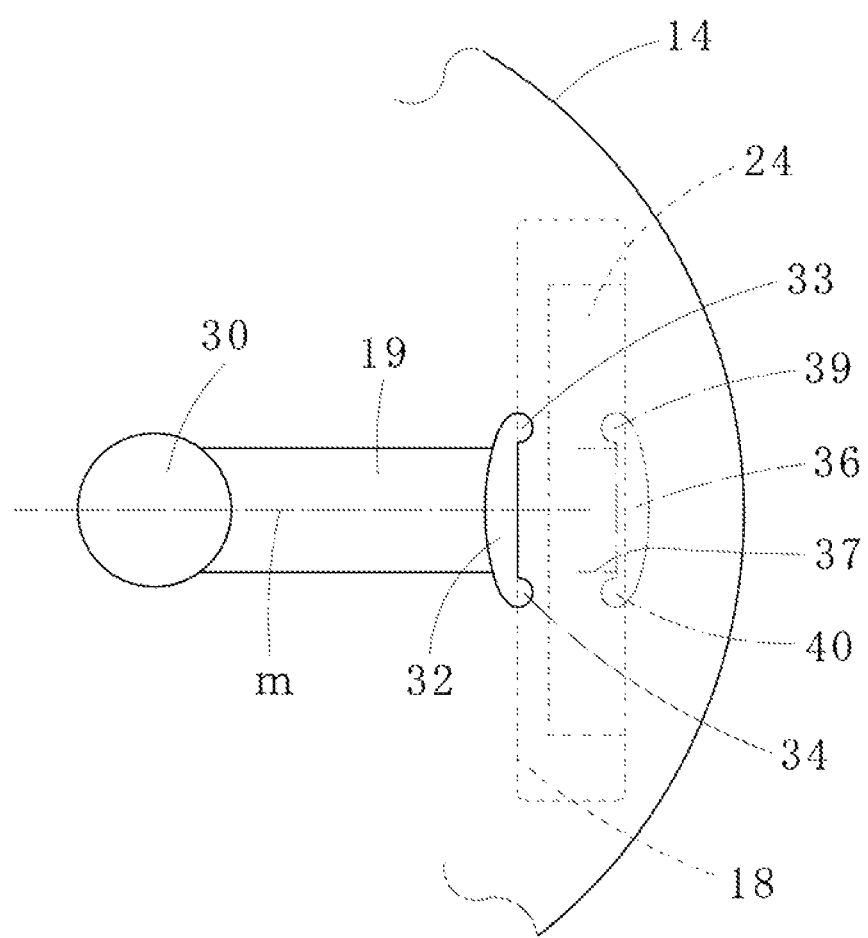
FIG. 2 is an explanatory diagram of a method of resin-sealing a laminated core according to a first embodiment of the present invention.

The detachable cull plate 14 is made of, for example, a hard steel plate or stainless steel plate with a thickness of 3-10 mm. As shown in FIG. 2, the cull plate 14 includes a counterbore 30 and the runner 19, in which the counterbore 30 is dovetailed with the resin reservoir 17 and a base of the runner 19 is continuing to the counterbore 30. The runner 19 has a channel section opening downward and extends to a center in a longitudinal direction of the magnet insertion hole 18 located in a downstream side. A terminal end in a radially outward side of the runner 19 includes a penetrated passage 32 broadened in a circumferential direction (i.e., a direction perpendicular to the radial direction). A width of the penetrated passage 32 is preferably in a range of 0.2-0.8 times a longitudinal width of the permanent magnet 24.

The penetrated passage 32 penetrates the cull plate 14 vertically and connects with a radially outward area of the runner 19. The penetrated passage 32 is symmetry with respect to a center line m of the runner 19 in the circumferential direction. Both ends in the circumferential direction of the penetrated passage 32 extending to a radially outward side include areas overlapping with the magnet insertion hole 18 of the core body 15 located above, and the resin injection holes 33, 34 having the same size with these areas are provided therein. The resin injection holes 33, 34 are arranged bilaterally symmetric with respect to a shaft center of the magnet insertion hole 18. Furthermore, the resin injection holes 33, 34 are located radially inward from the magnet insertion hole 18.

Now, the core body 15 is placed between the upper die 11 and the lower die 12 by the cull plate 14, the upper die 11 is moved down to sandwich (press) the core body 15 between the upper die 11 and the lower die 12. Then, the resin 29 stored in the resin reservoir 17 beforehand is ejected by pushing up the plunger 28. The resin 29 flows from the counterbore 30 to the penetrated passage 32 via the runner 19 and thereafter flows from the resin injection holes 33, 34 into the magnet insertion hole 18.

Since the resin injection holes 33, 34 are symmetric with respect to the magnet insertion hole 18 in the circumferential direction and located in the radially inward side of the magnet insertion hole 18 such that the resin injection holes 33, 34 have the same cross-sectional area, the permanent magnets 24 inside the magnet insertion hole 18 are evenly pressed to the radially outward side and then the resin 29 is cured. In this case, pressure exerted by the resin to the permanent magnets 24 works evenly from side to side, which prevents the permanent magnets 24 from leaning to the magnet insertion hole 18.

When the permanent magnets 24 are arranged in the radially inward side of the magnet insertion hole 18, as shown in FIG. 2 with two-dot chain lines, a penetrated passage 36 formed in the radially outward side of the magnet insertion hole 18 is used. An inverted-groove-shaped runner 37 is formed from the counterbore 30 to the penetrated passage 36. The penetrated passage 36 is symmetric with respect to the magnet insertion hole 18 in the circumferential direction, and parts of the penetrated passage 36 overlapping with the magnet insertion hole 18 are resin injection holes 39, 40.

Figure 3:
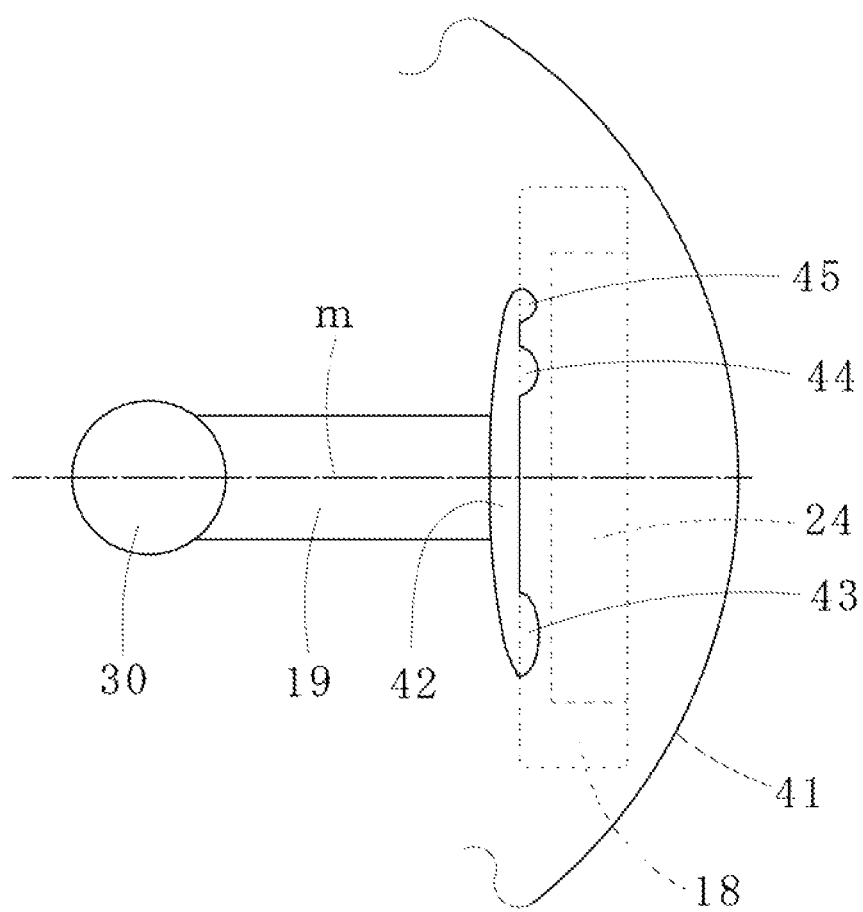
FIG. 3 is an explanatory diagram of a method of resin-sealing a laminated core according to a second embodiment of the present invention.

Referring to FIG. 3, a description will be given on a method of resin-sealing a laminated core according to a second embodiment of the present invention. In the method according to the second embodiment of the present invention, a penetrated passage 42 continuing to the runner 19 (a center line of which is m) formed in a cull plate 41 is asymmetric with respect to the magnet insertion hole 18 in the circumferential direction (the direction perpendicular to a radius). Also, resin injection holes 43-45 are formed in intersections of the penetrated passage 42 and the magnet insertion hole 18. The resin injection holes 43-45 are arranged in both sides in the circumferential direction with the center line m of the runner 19 in a way that an area of the resin injection hole 43 is identical with a total area of the resin injection holes 44, 45.

Alternatively, the following option can be taken: provided that the area of the resin injection hole 43 is S1, the areas of the resin injection holes 44, 45 are S2, S3, and distances from the center line m to the resin injection holes 43, 44, 45 are d1, d2, d3, then S1×d1≈S2×d2+S3×d3. By this, the permanent magnets 24 are more evenly pressed to the radially outward side of the magnet insertion hole 18. Furthermore, when the permanent magnets 24 are arranged in the radially inward side of the magnet insertion hole 18, the penetrated passage is located in the radially outward area of the magnet insertion hole 18 and the resin injection holes are formed by the intersections of the magnet insertion hole 18 and the penetrated passage.

Figure 4:
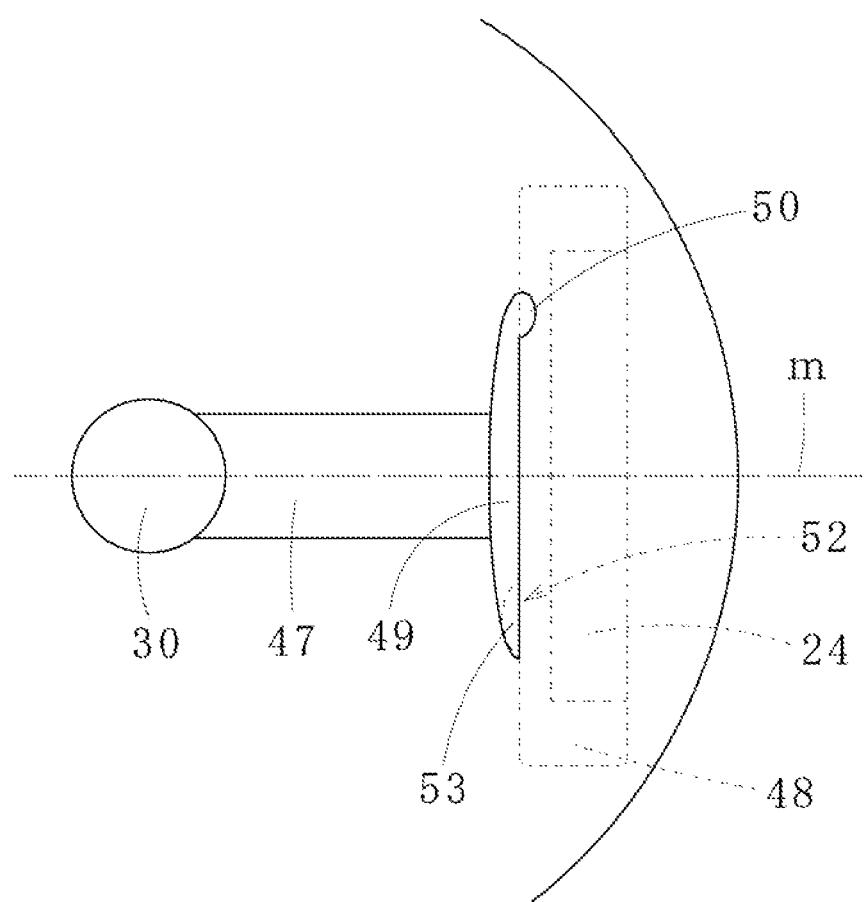
FIG. 4 is an explanatory diagram of a method of resin-sealing a laminated core according to a third embodiment of the present invention.
Figure 5:
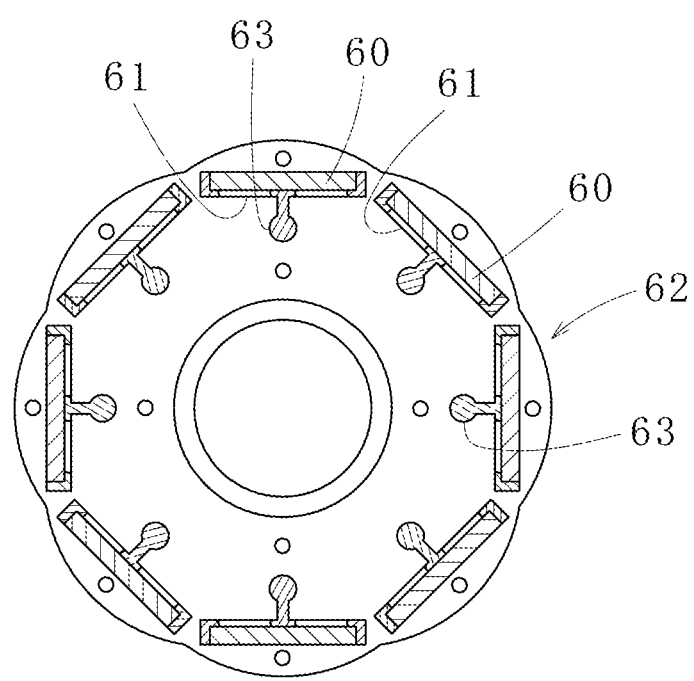
FIG. 5 is a plain view explaining a method of manufacturing a laminated core according to a conventional example.
Figure 6A:
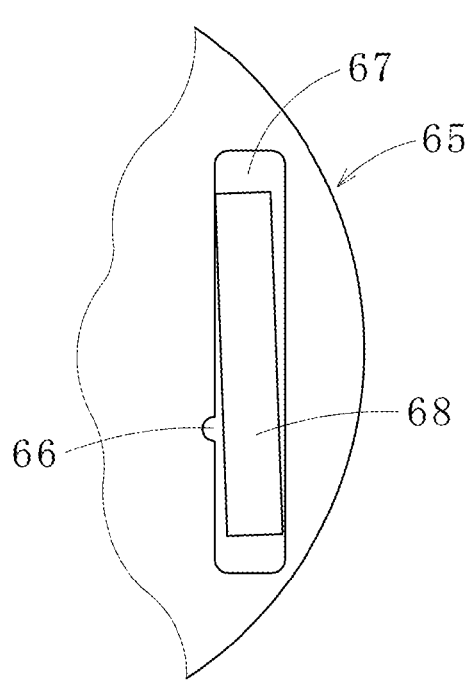
FIGS. 6(A) and 6(B) are explanatory diagrams showing a method of manufacturing a laminated core according to a conventional example, respectively.
Figure 6B:
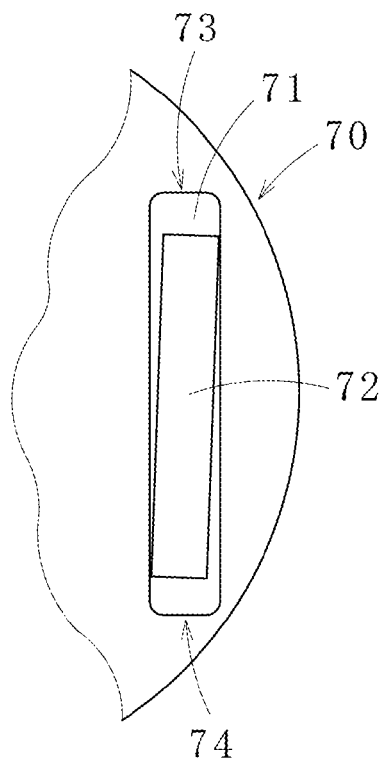

FIG. 4 shows a method of resin-sealing a laminated core according to a third embodiment of the present invention. As shown in the figure, a runner 47 having a groove shape opening downward extends from the counterbore 30 to the radially outward side. The runner 47 extends to near an inward end of a magnet insertion hole 48, and an end of the runner 47 includes a penetrated passage 49 broadened in a circumferential direction. The penetrated passage 49 is asymmetric with respect to the center line m, and one end of the penetrated passage 49 includes a resin injection hole 50 overlapping with the magnet insertion hole 48. The magnet insertion hole 49 located in the other end of the penetrated passage 49 includes a groove 52 having an arc-shaped cross section in a vertical direction. The other end of the penetrated passage 49 is overlapped with grove 52, forming a resin injection hole 53.

In this embodiment, the resin injection hole 50 formed in one side of the penetrated passage 49 and the groove 52 of the resin injection hole 53 formed in the other side of the penetrated passage 49 are approximately the same in a range of ±80%, and the distances thereto from the centerline m are also approximately the same in a range of ±80%. Therefore, the permanent magnets 24 are evenly pressed by the resin injected from the resin injection holes 50, 53 to sidewalls of the magnet insertion hole 48.

When the resin injection hole is formed in the radially outward side of the magnet insertion hole, the runner is extended to the radially outward side of the magnet insertion hole, the wide penetrated passage is formed in the circumferential direction, and an end of the penetrated passage is connected to the magnet insertion hole. In this case, (a) the magnet insertion hole is rectangular in cross-section and the penetrated passage overlaps with the magnet insertion hole or (b) a recess (vertical groove) is formed inside the magnet insertion hole and the penetrated passage communicates with the recess.

In other words, in the above-described embodiments, the plural resin injection holes are formed along longitudinal sidewalls of the permanent magnets having rectangular cross sections.

The present invention is not limited to the above-described embodiments, but can include modifications within a scope of the present invention. For example, the position of the counterbore can be changed. The runner does not need to continue to the base of the counterbore, the runner can continue to the inside of the counterbore.

In the above-described embodiments, the resin reservoir is provided in the lower die. However, the present invention can be used in a case where the resin reservoir is provided in the upper die.

In addition, the present invention can be used in a case where the resin is injected from one resin reservoir to the plural magnet insertion holes.

Furthermore, it is obvious to form the cull plate with one material plate, but the cull plate can be formed with the two material plates or three or more of the material plates.

REFERENCE SIGNS LIST

10: resin-sealing device, 11: upper die, 12: lower die, 14: cull plate, 15: core body, 17: resin reservoir, 18: magnet insertion hole, 19: runner, 21: core piece, 22: shaft hole, 24: permanent magnet, 25: top end surface, 26: gap, 28: plunger, 29: resin, 30: counterbore, 32: penetrated passage, 33, 34: resin injection hole, 36: penetrated passage, 37: runner, 39, 40: resin injection hole, 41: cull plate, 42: penetrated passage, 43-45: resin injection hole, 47: runner, 48: magnet insertion hole, 49: penetrated passage, 50: resin injection hole, 52: groove, 53: resin injection hole

The invention claimed is:

1. A method of resin-sealing a laminated core, comprising:

laminating a plurality of core pieces to form a core body including a plurality of magnet insertion holes circumferentially;

inserting permanent magnets having a rectangular cross-section into each of the magnet insertion holes of the core body;

pressing the core body with an upper die and a lower die in a direction where the core pieces are laminated; and injecting resin to the magnet insertion holes from a plurality of resin reservoirs provided in the upper die or the lower die, each pair of one of the plurality of resin reservoirs and one or more than one of the plurality of magnet insertion holes being connected via a corresponding runner formed in a removable cull plate, and thereby fixing the permanent magnets;

wherein an end of each runner comprises a plurality of resin injection holes with respect to a corresponding one of the magnet insertion holes, the resin injection holes being formed only along and facing one of longitudinal sidewalls of each of the permanent magnets, and wherein the injected resin presses the permanent magnets inserted in the magnet insertion holes to one side in a radial direction of each of the magnet insertion holes.

2. The method according to claim 1, wherein a terminal end of each runner includes a penetrated passage vertically penetrating the cull plate, and parts shared by each penetrated passage and each magnet insertion hole form the resin injection holes.

3. The method according to claim 2, wherein the plurality of the resin injection holes are located in radially inward sides or radially outward sides of the magnet insertion holes.

4. The method according to claim 2, wherein each of the resin injection holes has an identical cross sectional area.

5. The method according to claim 1, wherein each of the resin injection holes has a different cross sectional area.

* * * * *